US007873904B2

(12) United States Patent
Wang et al.

(10) Patent No.: US 7,873,904 B2
(45) Date of Patent: Jan. 18, 2011

(54) INTERNET VISUALIZATION SYSTEM AND RELATED USER INTERFACES

(75) Inventors: Min Wang, Beijing (CN); Weizhu Chen, Beijing (CN); Benyu Zhang, Beijing (CN); Zheng Chen, Beijing (CN); Jian Wang, Beijing (CN)

(73) Assignee: Microsoft Corporation, Redmond, WA (US)

( * ) Notice: Subject to any disclaimer, the term of this patent is extended or adjusted under 35 U.S.C. 154(b) by 383 days.

(21) Appl. No.: 11/972,073

(22) Filed: Jan. 10, 2008

(65) Prior Publication Data

US 2008/0256444 A1 Oct. 16, 2008

Related U.S. Application Data

(60) Provisional application No. 60/911,709, filed on Apr. 13, 2007.

(51) Int. Cl.
*G06F 17/30* (2006.01)
(52) U.S. Cl. .................................. 715/715; 715/757
(58) Field of Classification Search .......... 715/715, 715/757
See application file for complete search history.

(56) References Cited

U.S. PATENT DOCUMENTS

| 6,219,045 | B1 * | 4/2001 | Leahy et al. ............... 715/757 |
| 6,281,898 | B1 * | 8/2001 | Nikolovska et al. ......... 715/848 |
| 6,608,549 | B2 * | 8/2003 | Mynatt et al. .............. 340/5.8 |
| 6,924,822 | B2 * | 8/2005 | Card et al. ................. 345/660 |
| 7,069,518 | B2 * | 6/2006 | Card et al. ................. 715/776 |
| 7,120,870 | B1 * | 10/2006 | Nakamura ................. 715/236 |
| 7,139,982 | B2 * | 11/2006 | Card et al. ................. 715/786 |
| 7,146,359 | B2 | 12/2006 | Castellanos |
| 7,146,576 | B2 * | 12/2006 | Chang et al. ............... 715/848 |
| 2003/0120649 | A1 | 6/2003 | Uchino et al. |
| 2004/0010564 | A1 | 1/2004 | Imaida et al. |

(Continued)

FOREIGN PATENT DOCUMENTS

KR 100522029 10/2005

(Continued)

OTHER PUBLICATIONS

Mat-Hassan, et al., "Associating Search and Navigation Behavior Through Log Analysis", retrieved on May 9, 2007, at <<http://portal.acm.org/citation.cfm?id=1067995>>, ACM, 2007, pp. 7.

(Continued)

*Primary Examiner*—Don Wong
*Assistant Examiner*—Kim T Nguyen
(74) *Attorney, Agent, or Firm*—Lee & Hayes, PLLC

(57) ABSTRACT

Systems and methods are described for an Internet visualization system and related user interfaces. In one implementation, the system analyzes Internet search logs to determine most popular search queries across the world at a current time. A user interface displays a keyword of each of the most popular queries in a single visual display that relates each query to a geographical location of greatest popularity. The system can also filter queries according to demographics. In one implementation the user interface provides a 3-dimensional Internet visualization that adopts an ocean or seascape theme. The ocean floor displays a map of the world, and query bubbles rise from geographical locations on the map. The size and duration of each query bubble denotes the relative popularity of a given query.

18 Claims, 7 Drawing Sheets

PROCESS OF DISPLAYING QUERY BUBBLES: THE TOP 10 QUERIES

U.S. PATENT DOCUMENTS

| | | | |
|---|---|---|---|
| 2004/0189702 A1* | 9/2004 | Hlavac et al. | 345/757 |
| 2005/0022126 A1* | 1/2005 | Hatscher et al. | 715/708 |
| 2005/0065774 A1 | 3/2005 | Doganata et al. | |
| 2005/0086612 A1* | 4/2005 | Gettman et al. | 715/848 |
| 2005/0216861 A1* | 9/2005 | Hurewitz et al. | 715/822 |
| 2006/0004850 A1 | 1/2006 | Chowdhury | |
| 2006/0026147 A1* | 2/2006 | Cone et al. | 707/3 |
| 2006/0026184 A1 | 2/2006 | Hewing et al. | |
| 2006/0047696 A1* | 3/2006 | Larson et al. | 707/103 R |
| 2007/0005646 A1 | 1/2007 | Dumais et al. | |
| 2007/0027865 A1 | 2/2007 | Bartz et al. | |
| 2007/0043706 A1 | 2/2007 | Burke et al. | |
| 2007/0050716 A1* | 3/2007 | Leahy et al. | 715/706 |
| 2007/0073667 A1 | 3/2007 | Chung | |
| 2007/0271255 A1* | 11/2007 | Pappo | 707/5 |
| 2008/0016019 A1* | 1/2008 | Loftus et al. | 706/47 |
| 2009/0287559 A1* | 11/2009 | Chen et al. | 705/14.23 |

FOREIGN PATENT DOCUMENTS

| | | |
|---|---|---|
| KR | 20070003268 | 1/2007 |
| KR | 20070036110 | 4/2007 |
| WO | WO2005106714 | 11/2005 |

OTHER PUBLICATIONS

Wang, et al., "Detecting Dominant Locations from Search Queries", available at least as early as May 8, 2007, at <<http://research.microsoft.com/users/xingx/QLD.pdf>>, ACM, 2005, pp. 8.

Zhou, et al., "Learning User Clicks in Web Search", available at least as early as May 8, 2007, at <<http://www.ijcai.org/papers07/Papers/IJCAI07-188.pdf>>, IJCAI, 2007, pp. 1162-1167.

PCT Search Report for Application No. PCT/US2008/060156, mailed Jul. 30, 2008 (11 pages).

* cited by examiner

QUERIES SUBMITTED FROM DIFFERENT COUNTRIES AT THIS MOMENT

PROCESS OF DISPLAYING QUERY BUBBLES: THE TOP 10 QUERIES

INTERNET VISUALIZATION SYSTEM AND RELATED USER INTERFACES

RELATED APPLICATION

This application claims priority to U.S. Provisional Patent Application No. 60/911,709 to Wang et al, entitled, "Internet Visualization System and Related User Interfaces," filed Apr. 13, 2007, and incorporated herein by reference.

BACKGROUND

Across the world, a growing number of users are performing online searches to browse for information on the Internet, especially as search mechanisms improve and more mobile devices sport Internet searching capability. Collectively, such search queries contain the current interests and current focus of populations across different geographies. Logs of the searches, including search keywords and/or images submitted to search engines are available. Search logs and their corresponding search log data are very important and interesting. They contain a wealth of information about human interests and human reactions to events and trends. The record of hyperlinks clicked by users subsequent to a listing of the search results are also available, and these tag Internet and user behavior. This search log data can be mined, analyzed, and subjected to statistical treatment to infer conclusions and observe human trends. However, conventional techniques for examining and viewing search log data tend to be rudimentary, non-visual, and limited to relatively small geographical localities.

SUMMARY

Systems and methods are described for an Internet visualization system and related user interfaces. In one implementation, the system analyzes Internet search logs to determine most popular search queries across the world at a current time. A user interface displays a keyword of each of the most popular queries in a single visual display that relates each query to a geographical location of greatest popularity. The system can also filter queries according to demographics. In one implementation the user interface provides a 3-dimensional Internet visualization that adopts an ocean or seascape theme. The ocean floor displays a map of the world, and query bubbles rise from geographical locations on the map. The size and duration of each query bubble denotes the relative popularity of a given query.

This summary is provided to introduce the subject matter of an Internet visualization system, which is further described below in the Detailed Description. This summary is not intended to identify essential features of the claimed subject matter, nor is it intended for use in determining the scope of the claimed subject matter.

DETAILED DESCRIPTION

Overview

This disclosure describes Internet visualization systems and related user interfaces. In one implementation, an exemplary system gathers Internet search logs in real-time, or near real-time. Such comprehensive search logs are mined to determine the current foci and collective consciousness of numerous Internet users, and the degree of importance of each focus. Search log data is thus analyzed to find out "what is on the mind" of many people at once, and the large number of people involved lends weight and validity to patterns recognized in mined search log data. This real-time mining and display of search logs captures the current inquisitive drive of large groups of people. The exemplary system described herein can display humankind's instant reaction to current events in the world. Or, the exemplary system can show current regional interests in real-time. The exemplary system finds application in the fields of entertainment, Internet analysis, psychology, advertising, and statistical analysis of human thought.

The exemplary Internet visualization system and related user interfaces provide a "new generation-friendly" user experience that presents real-time, large-scale search log data for entertainment and analytic value, mining the search log data and representing mined results on an entertaining and user-friendly user interface. The exemplary system presents a real-time "pulse of the Internet," giving the user a new experience for browsing and observing Internet activity.

Exemplary System

Figure 1:
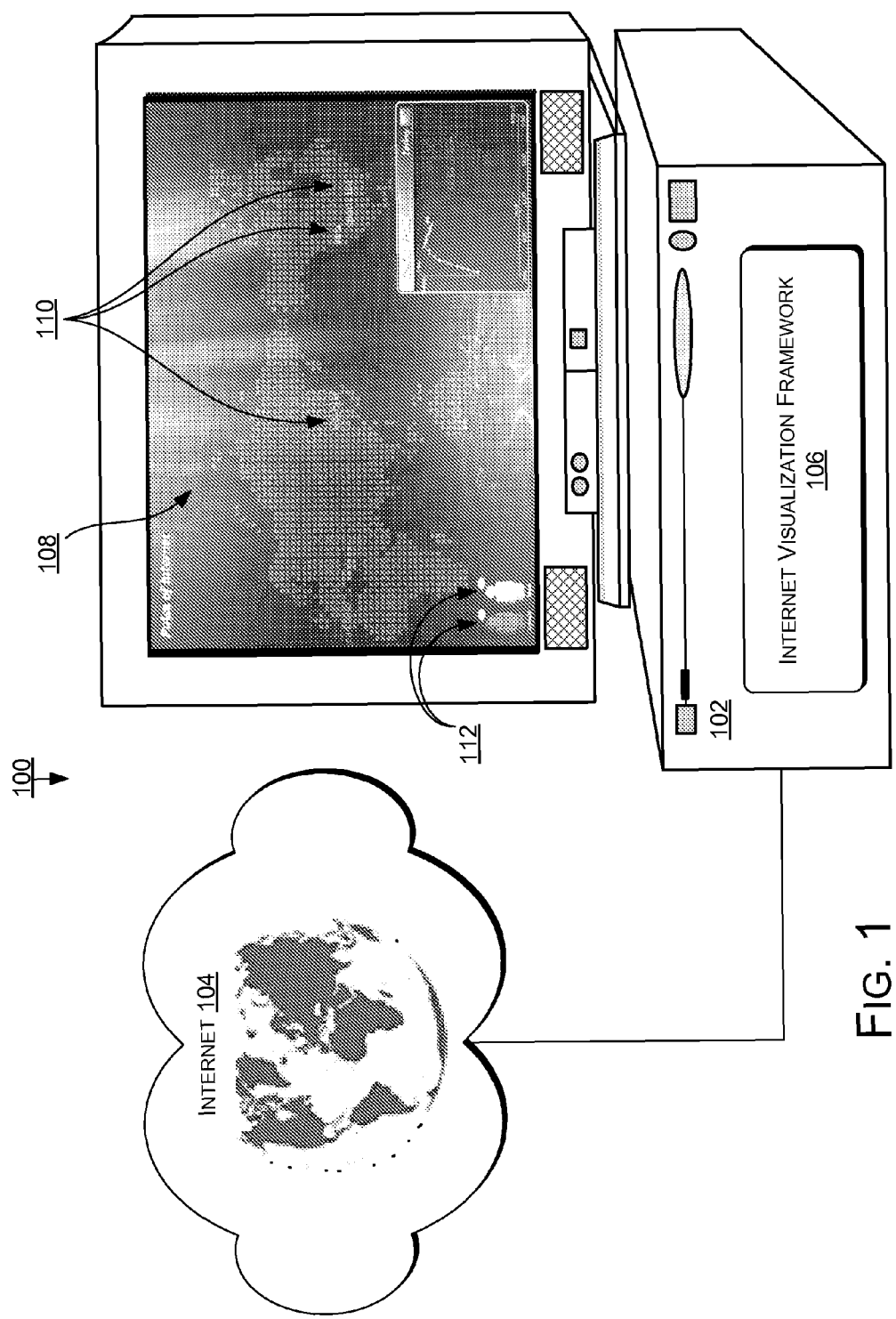
FIG. 1 is a diagram of an exemplary Internet visualization system.

FIG. 1 shows an exemplary Internet visualization system 100. A host computing device 102 is connected to the Internet 104 and hosts an Internet visualization framework 106. The computing device 102 may be a desktop computer, notebook computer, or other computing device that has a processor, memory, data storage, etc. In one implementation, the exemplary system 100 presents a user interface (UI) display 108 that summarizes an aspect of Internet activity of the entire world or a given region. For example, the UI display 108 may show the most popular queries 110 in each part or in designated parts of the world. The system 100 typically summarizes and displays some global aspect of human behavior or psychology with respect to Internet use. The UI display 108 may also visually breakdown the displayed popular queries by attributes, such as by user gender 112. Dynamic UI display changes can show changing human behavior or psychology of the worldwide Internet-user community in real-time.

Exemplary Engine

Figure 2:
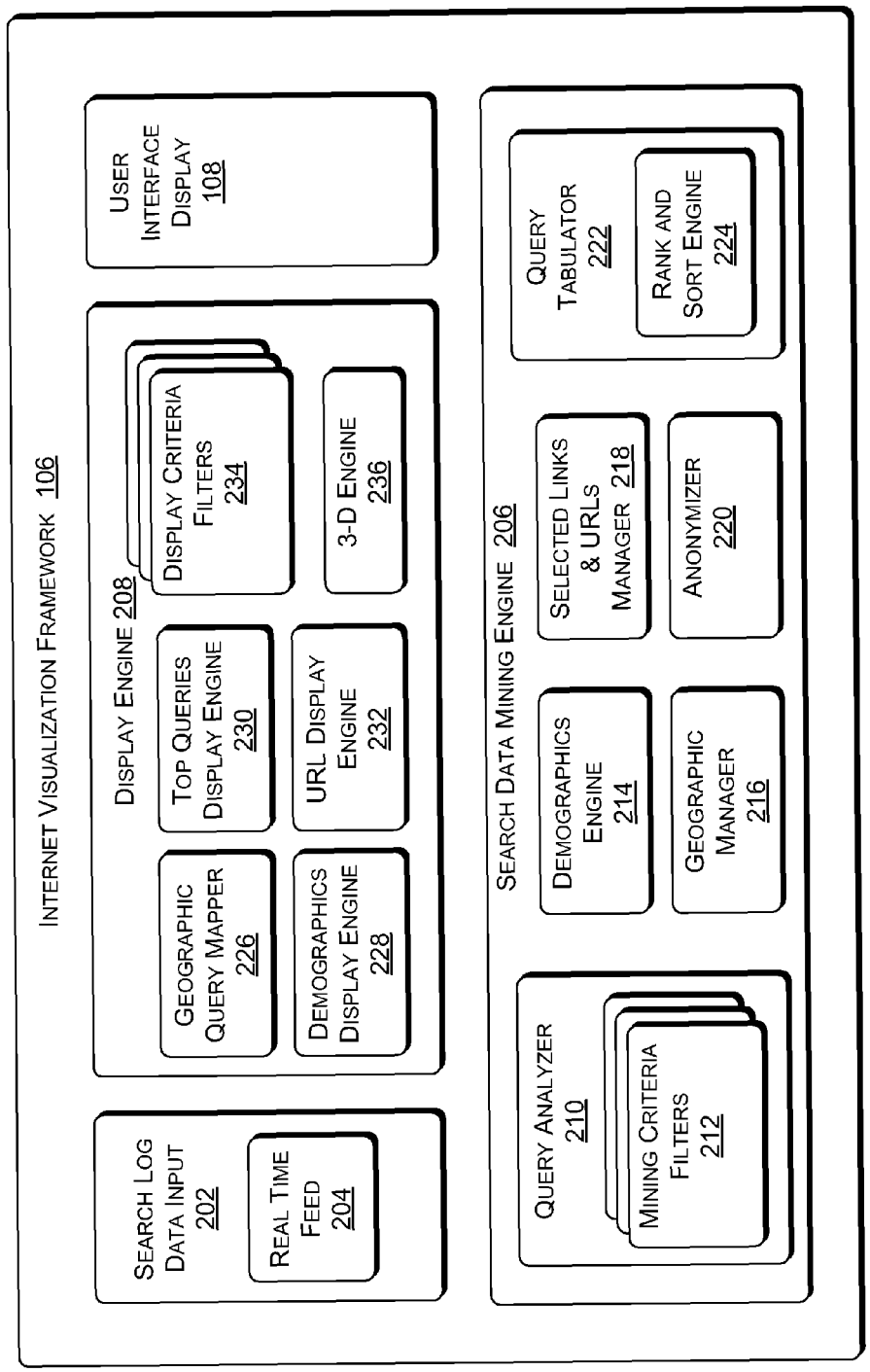
FIG. 2 is a block diagram of an exemplary Internet visualization framework.

FIG. 2 shows the Internet visualization framework 106 of FIG. 1 in greater detail. The illustrated implementation is only one example configuration, for descriptive purposes. Many other arrangements of the components of an exemplary Internet visualization framework 106 are possible within the scope of the subject matter. Such an exemplary Internet visualization framework 106 can be executed in various combinations of hardware, software, firmware, etc.

The illustrated framework 106 includes a search log data input 202, with one or more real-time feeds 204. The framework 106 also includes a (search data) mining engine 206, a display engine 208, and the user interface (UI) display 108.

The search data mining engine 206 may further include a query analyzer 210 with mining criteria filters 212, a demographics engine 214, a geographic manager 216, a "selected links & uniform resource locators (URLs)" manager 218, an anonymizer 220, and a query tabulator 222 that may include a rank & sort engine 224.

The display engine 208 may further include a geographic query mapper 226, a demographics display engine 228, a top queries display engine 230, a URL display engine 232, display criteria filters 234, and a 3-D engine 236.

Operation of the Exemplary Framework

In one implementation, the exemplary framework 106 accepts search data from one search service provider, search engine, company, or website via the search log data input 202 and/or real-time feed 204. Or, the search log data input 202 may receive input combined from multiple search modalities available on or associated with the Internet 104. The mining engine 206 mines the search log data according to various criteria. For example, the exemplary query analyzer 210 may mine according to the most popular queries submitted by users according to country or geographical region, according to various groups or organizations, according to web pages linked to by the users, according to demographic information of the user, such as gender, etc. Thus, the query analyzer 210 can apply and combine various search data mining criteria filters 212. An example of a combined mining criteria filters 212 set is "most popular queries" (as a first criterion) submitted by users "in a particular country" (the second criterion).

In one implementation, the mining engine 206 may include various engines to manage the query analysis and the combination of mining criteria filters 212. The demographics engine 214 and geographic engine 216 may combine various of the mining criteria filters 212 to narrowly specify the search log data to be mined and displayed by the display engine 208. For example, the demographics engine 214 and geographic engine 216 may combine filters 212 to specify mining of queries from a certain country, gender, and age group, e.g., queries from young adult women in the country of Turkey. The URLs manager 218 may mine those URLs being accessed in conjunction with a popular query. The query tabulator 222 receives the filtered query analysis results and the rank & sort engine 224 prepares sorted lists of the results for the UI display 108 or for the display engine 208.

The exemplary framework 106 also features an exemplary user interface display 108 for presenting the mining results in an intuitive and entertaining manner. In one implementation, as described in more detail below, the UI display 108 presents a 3-dimensional (3-D) visual construct rendered on the 2-dimensional (2D) surface of a computer display. As mentioned, the exemplary framework 106 and UI display 108 can display search activity of the Internet 104 in near real-time.

In one implementation, the anonymizer 220 strips some queries of private and personal information, if such search log data have not already been anonymized by the search service provider.

The exemplary framework 106 may also use display criteria filters 234 to sort and sift the mined search log data. Such display criteria filters 234 may increase the meaningfulness of the mined search log data to be presented. For example, the display criteria filters 234 may optionally filter out noise or repetitiveness in the queries, may filter out unintelligible queries, or may filter out undesirable queries, such as search queries that include illegal or undesirable requests. Some display criteria filters 234 are also analogous to the mining criteria filters 212. For example, a country filter may toggle queries from a certain country on and off, even though the same effect could be achieved by a mining criteria filter 212.

In the exemplary display engine 208, a geographic query mapper 226 may manage the location of popular queries on the UI 108 in order to show the relationship between the query and its geographical origin or location of greatest popularity, e.g., on a displayed map 304. The demographics display engine 228 likewise manages display of demographic attributes of popular queries, for example color-coding results to show gender or other specified demographic attributes. The top queries display engine 230 manages display of the dynamically changing set of popular queries and their relative popularity in comparison with each other. The URL display engine 232 manages URLs to be displayed in conjunction with a displayed popular query 302, for example, the URL display engine 232 may generate an additional pane in which to post a list of relevant URLs. The 3-D engine 236 may generate a particular 3-D visual display to show query results and may synthesize smooth transitions between different views of the 3-D presentation as displayed on a 2-D display surface.

The exemplary framework 106 aims to bring the Internet 104 to life for users. A typical exemplary UI display 108 shows Internet 104 search activity in real-time and organized according to mining criteria and display criteria. Custom reporting readouts may be selected and displayed in logical relation to the displayed Internet search activity. The exemplary framework 106 thus correlates different kinds of Internet search and activity information together to provide users an integrated view of current web search activities of the Internet 104. In one implementation, the result is a representation of the entire Internet 104—the whole world of Internet users—and its real-time search activity mapped and dynamically living in the UI display 108. The exemplary UI display 108 may also present the integrated Internet search activity by logical or visual theme, for example pictured as a 3-D ocean/seascape scenario, or as an aquarium scenario, etc. In one implementation, the user can observe worldwide or regional Internet search activity, organized and color-coded, as if watching an actively functioning system or "brain."

Implementations of the Internet visualization provided by the UI display 108 assist users to discover aspects of the Internet 104 and help users to become acquainted with other users' interests with regard to the Internet 104. The exemplary framework 106 can display many different models to simulate real world phenomena and show the mined search information in an intuitive manner. Thus, users can more easily obtain information for observing real-time Internet activity, including what is popular, being intensively searched, or "hot" in the world. The Internet visualization framework 106 provides a summary overview of the hottest queries in each location, the demographic information for each hot query, trends of each query, and URL information resulting from users clicking links associated with particular queries or query categories.

Accordingly, the exemplary framework 106 has entertainment value, because it is fun to know what is currently hot on the Internet 104, e.g., based on location, demography and category, trend information, and the user-selected "clicked" URL information.

The exemplary framework 106 has analytic value because when users query on a keyword in a region, it is possible to see detailed analysis of that keyword/region, location information, category information, etc.

The exemplary framework 106 also enables users to better visualize the resulting data and information in one glance, giving the user an intuitive sense of Internet behavior.

Exemplary User Interfaces

Figure 3:
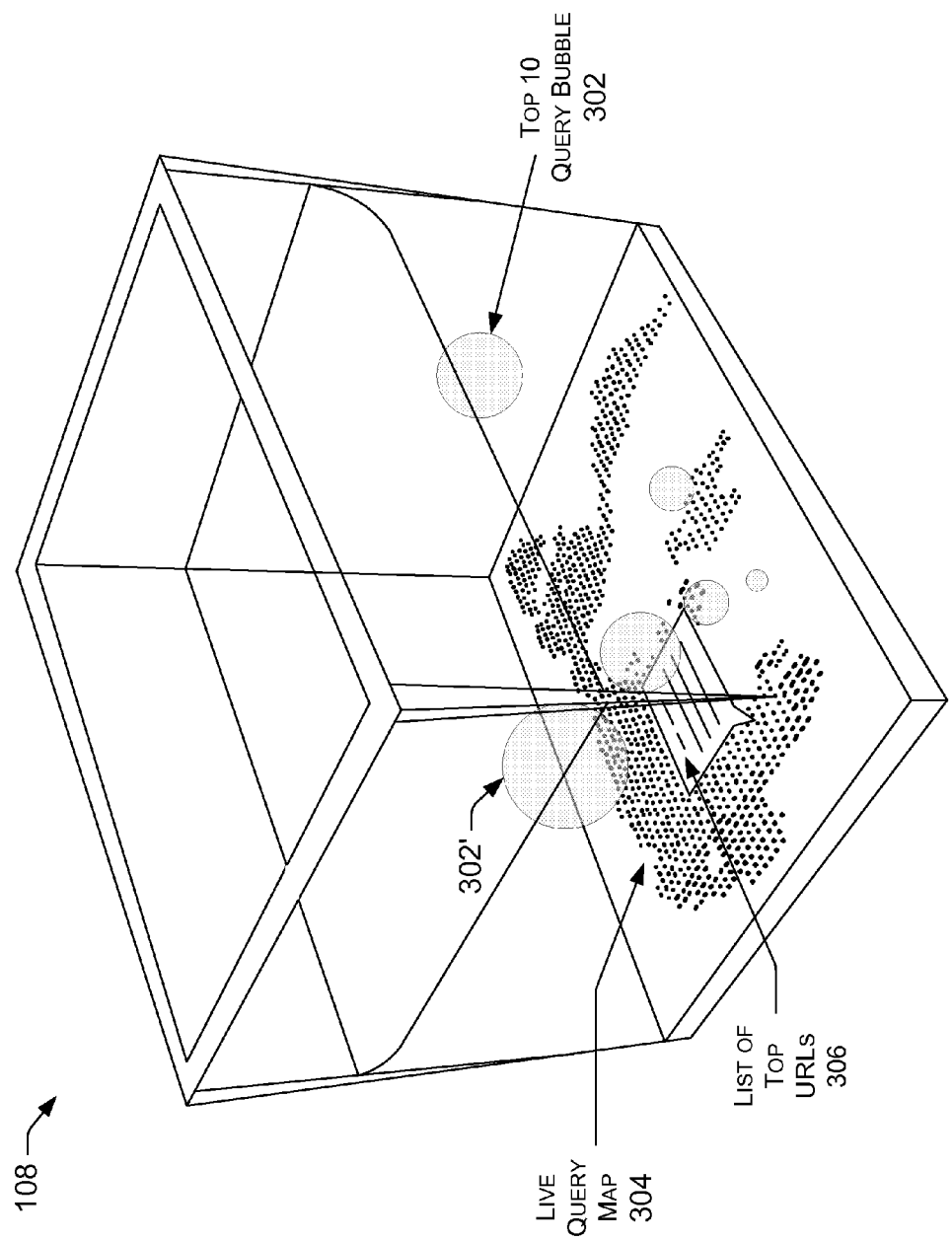
FIG. 3 is a diagram of an exemplary 3-dimensional user interface that displays popular queries using an ocean visual theme.

Different implementations of the exemplary UI display 108 visualize the integrated Internet search information from worldwide Internet-user activity. FIG. 3 shows one implementation of an exemplary UI display 108 for portraying the Internet activity" a "query ocean," which consists of a 3-D pictorial representation of an ocean with query keyword bubbles 302. In this implementation, a map of the world 304 or of a geographical region is displayed on the floor of the ocean. Query bubbles 302 representing the most popular search queries rise from their respective continents, countries, or locales of origin. As the query bubbles 302 rise over time toward the surface of the displayed ocean, the query bubbles either enlarge or shrink, depending on whether the search query grows or shrinks in popularity among current Internet users. When the query bubbles contain search keywords, then in one implementation a user may also click on the query bubble to obtain a URL list 306 of the most popular URLs being clicked in association with the keywords. Clicking on one of the listed URLs may bring up actual web pages, as will be described further below with respect to FIG. 6.

Figure 4:
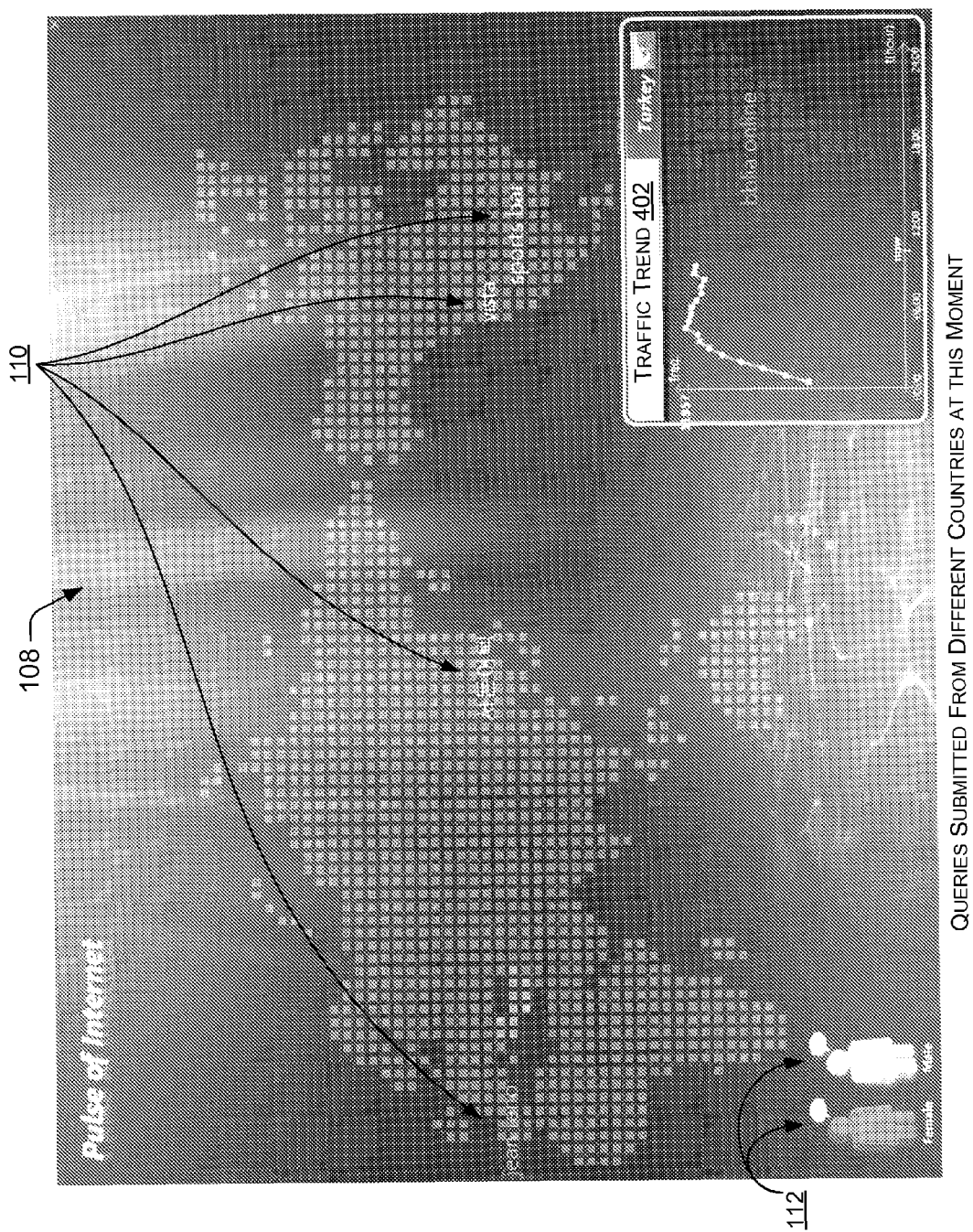
FIG. 4 is a screenshot of a top view of the user interface shown in FIG. 3.

FIG. 4 shows a top view of the exemplary 3-D ocean query UI display 108. From this top view the map 304 shows the origin of the most popular queries 110. For example, the most popular keywords currently being searched are shown in front of their respective locations of origin. Again, demographics of the various queries can also be displayed, such as the relative ratio of each gender 112 making the query. In one implementation, the user can also click one of the displayed keywords to show a list of most popular URLs being accessed with respect to that keyword.

In one implementation, the top view of the ocean query UI display 108 may present various insets or additional panes. For example, a traffic trends region 402 on the UI display 108 can show the relative number of users submitting a particular query in a given location with respect to time. Alternatively, the traffic trends region 402 can show the relative number of hits on a popular URL by users from a given location with respect to time.

Figure 5:
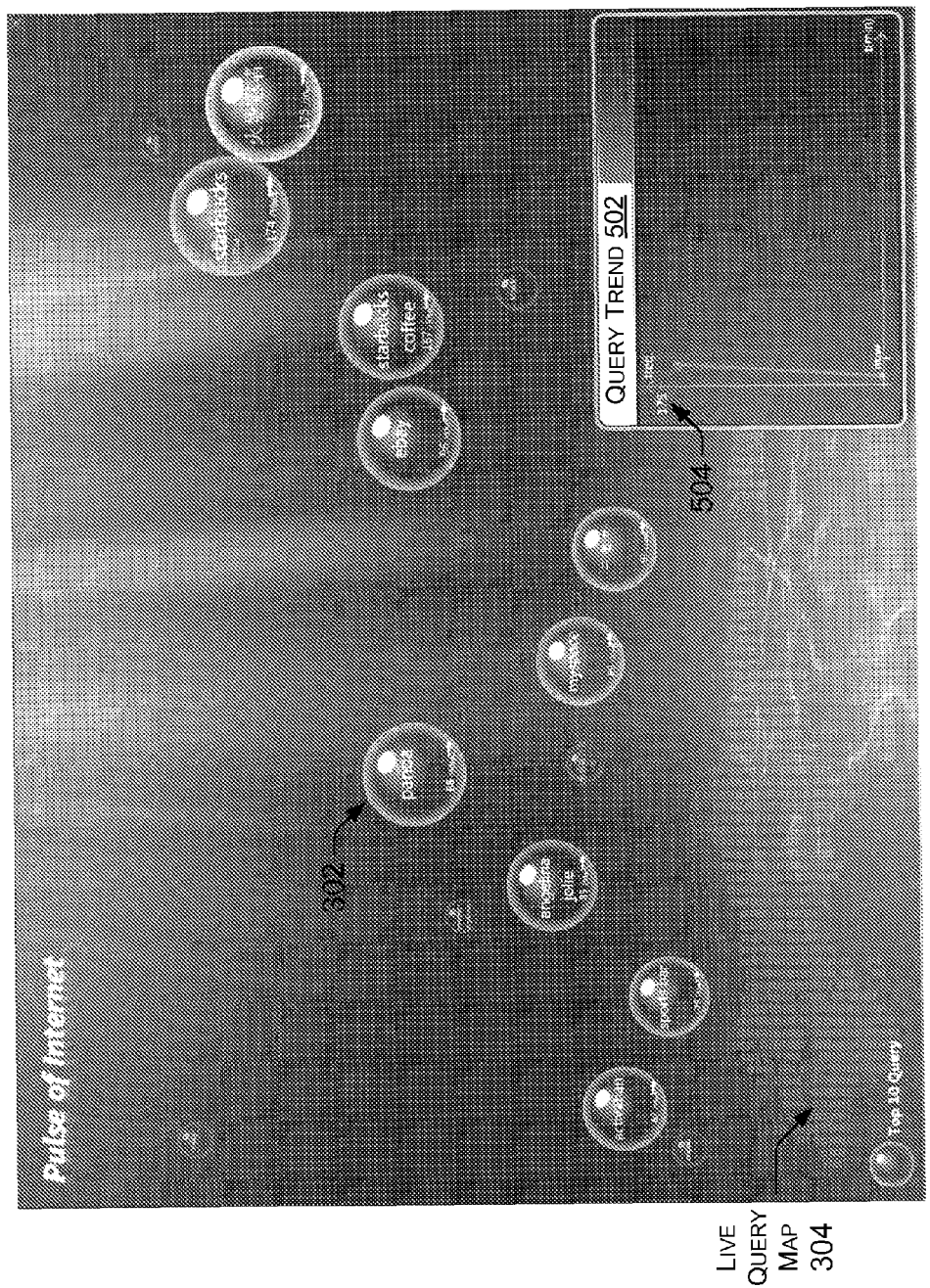
FIG. 5 is a screenshot of a side view of the user interface shown in FIG. 3.

FIG. 5 shows a side view of the exemplary 3-D ocean query UI display 108. From the side view, each query bubble 302 represents an individual search query. The user can see the life cycle of each query bubble 302 as it appears, grows, and disappears. In a given locale, as the number of users searching the Internet 104 for a particular query surpasses a threshold, a query bubble 302 appears, preferably at a certain place on the map 304 being displayed on the floor of the query ocean in order to show a geographical origin of interest in the query. If the query bubble 302 becomes larger, it means that there are more users asking this query at the current moment.

Color may be applied to each query bubble 302 to represent the demographics. For example, color may be used to designate the relative gender 112 or other criteria associated with users submitting the query. A colored 3-D ocean graphic UI display 108 with keyword query bubbles 302 is preferably used to visualize query information. In one implementation, as time passes, there are ten (or some other number) of large query bubbles on the user interface display at a time. These designate the top ten queries from around the world.

A query trend pane 502 can be displayed to show the activity associated with a given query on relatively short timeframes. For example, the query trend pane 502 may graphically show the number of users 504 submitting a particular query or keyword in a minute-by-minute timeframe.

Figure 6:
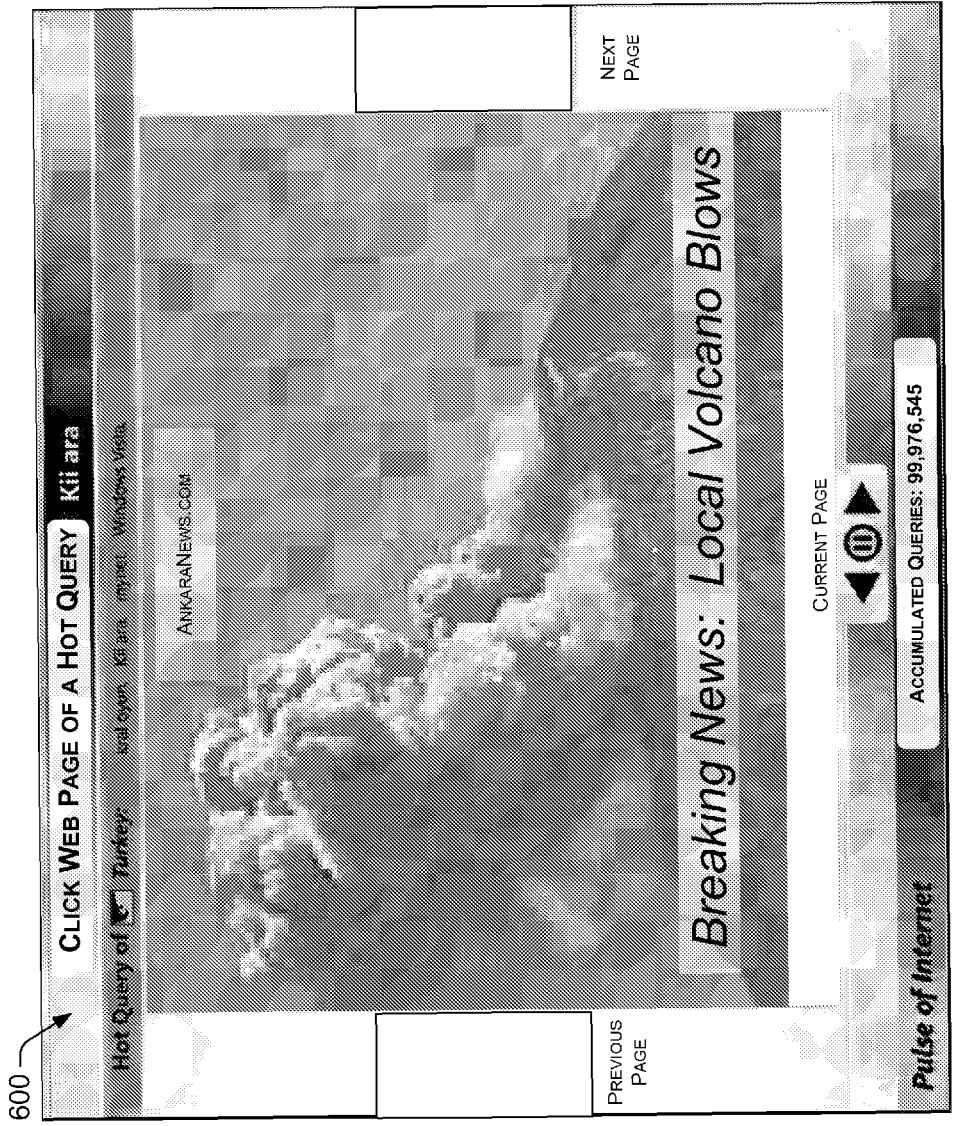
FIG. 6 is a screenshot of an example frequently accessed web page displayed in association with a most popular Internet query as determined by the exemplary Internet visualization system.

FIG. 6 shows a page display UI 600 that displays the top clicked page(s) resulting from a given query, e.g., the web pages associated with the top URL link(s) accessed with respect to a certain query. This gives users an intuitive and visual feel for what is happening around the world, and what other people are searching at the present moment. In one implementation the page display UI 600 takes the form of a page player UI 600 that can traverse backwards and forwards slideshow-style through a list of most popular pages associated with a query. The page display UI 600 can include pause and automatic slideshow functions.

Exemplary Method

Figure 7:
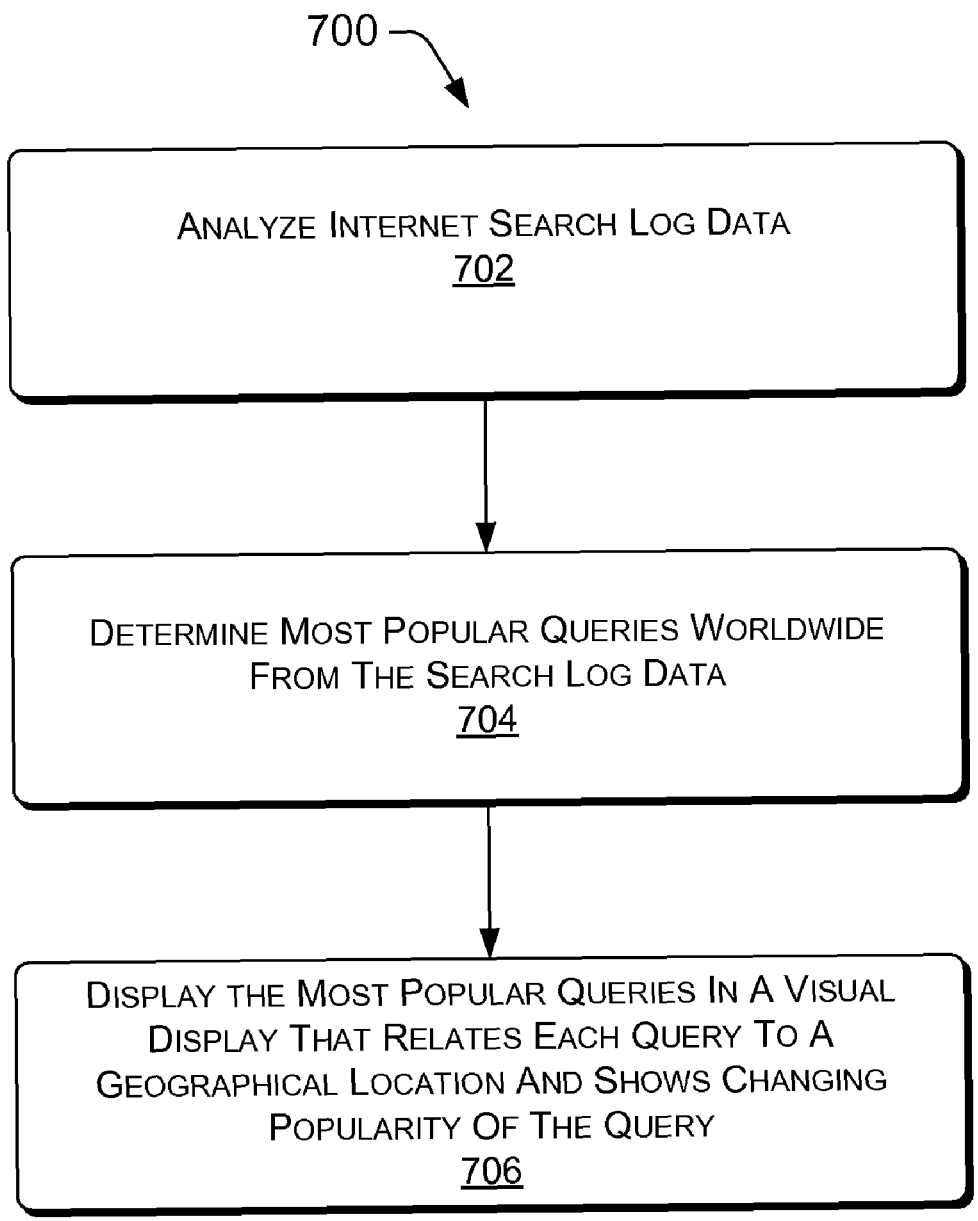
FIG. 7 is a flow diagram of an exemplary method of visualizing Internet activity.

FIG. 7 shows an exemplary method 700 of visualizing Internet activity. In the flow diagram, the operations are summarized in individual blocks. The exemplary method 700 may be performed by hardware, or combinations of hardware and software, for example, by components of the exemplary Internet visualization framework 106.

At block 702, Internet search log data is analyzed. The analyzing may include filtering most popular queries across multiple geographic locations by criteria filters that sort Internet search queries by location and/or demographics. The demographics may include such attributes as gender, age, nationality, organization, interests, income, profession, hobbies, or shopping habits, web links clicked, etc. The search logs are received and analyzed in real-time or near real-time. The analyzing may include anonymizing the search logs before processing the logs to determine most popular queries.

At block 704, the most popular queries worldwide are determined from the Internet search log data. In one implementation, the top ten queries worldwide, or in multiple selected geographical locations, are calculated. Metadata associated with each popular query may also be mined from the search logs. For example, each popular query may be associated with location statistics and other demographics of users making the query.

At block 706, the most popular queries are presented in a visual display that relates each query to a geographical location. The dynamically changing popularity and/or changing location of each popular query are also displayed. For example, a certain query related to breaking news may originate at one location on the globe, and a display of the query may change locations around the globe as the breaking news travels around the world.

In one implementation, the most popular queries are displayed in a 3-D visualization that shows keywords of the most popular queries as variously sized query bubbles in an underwater ocean scene. The ocean floor portrays a map of the world, and the query bubbles rise from their locations of origin. The size of each query bubble changes in real-time in relation to the changing popularity of a given query. A user may click a query bubble to spawn a displayed list of most popular URLs being clicked in relation to the popular query or a display of most popular web pages being accessed in relation to the popular query. The user may see different aspects of the displayed 3-D information by selecting different views, for example, a 2-dimensional top view or side view of the 3-D ocean display.

Conclusion

Although exemplary systems and methods have been described in language specific to structural features and/or methodological acts, it is to be understood that the subject matter defined in the appended claims is not necessarily limited to the specific features or acts described. Rather, the specific features and acts are disclosed as exemplary forms of implementing the claimed methods, devices, systems, etc.

The invention claimed is:

1. A method, comprising:
obtaining Internet search log data;
analyzing the Internet search log data to find most popular queries over multiple locations at a current time;
displaying a set of the most popular queries on a user interface with a three dimensional visualization, the displaying including:
displaying each popular query in relation to a location associated with the popular query;
displaying a relative magnitude of a popularity of each query;
displaying changes in the popularity of each query over time; and
displaying changes in the set of the most popular queries over time,
wherein the three dimensional visualization is configured to show relationships between the location associated with the popular query, the relative magnitude of the popularity of each query, the changes in the popularity of each query over time, and the changes in the set of the most popular queries over time.

2. The method of claim 1, wherein the obtaining, analyzing, and displaying are executed in real-time or near real-time.

3. The method of claim 1, wherein the analyzing further includes correlating different types of information from the search log data to provide users an integrated view of current web search activities, wherein the different types of information include: geographic origins of queries, demographics of Internet users submitting each query, most popular queries for a given geographical region or demographic category, clicked-on links associated with each query, and/or displayed pages of the clicked-on links.

4. The method as recited in claim 1, wherein displaying a set of the most popular queries on a user interface includes presenting the queries according to a visual theme, and presenting related information according to the visual theme, wherein the related information includes the locations associated with each query, the relative magnitude of the popularity of each query, the changes in the popularity of each query over time, and the changes in the set of the most popular queries over time.

5. The method as recited in claim 4, wherein the visual theme comprises an ocean visual theme or a seascape visual theme.

6. The method as recited in claim 5, wherein displaying the set of most popular queries according to an ocean visual theme includes:
displaying a map of at least part of the world on the ocean floor;
displaying each popular query as a variable-size bubble in ocean water;
displaying a life cycle of each popular query as a movement of each respective bubble toward the surface of the ocean water; and
displaying a popularity of each bubble as a dynamically changing relative size of each bubble.

7. The method as recited in claim 6, further comprising depicting the visual theme in the user interface as a 3-dimensional section of an ocean, wherein 2-dimensional views from a side or a top of the 3-D section of the ocean are user selectable.

8. The method as recited in claim 1, wherein displaying each popular query includes making each displayed popular query an active hyperlink to a list of URLs associated with the popular query, wherein user-selecting the displayed popular query initiates a display of most popular URLs associated with the user-selected popular query.

9. The method as recited in claim 8, further comprising making each popular URL an active hyperlink to a web page associated with the URL, wherein user-selecting a displayed URL initiates a display of the web page associated with the URL.

10. The method as recited in claim 9, further comprising presenting a slideshow of the web pages associated with the URLs and presenting user controls for operating the slideshow.

11. An Internet visualization system, comprising:
a computing device;
an Internet visualization framework to run on the computing device, including:
an input to receive Internet search logs;
a query analyzer to determine most popular search queries across the world at a current time;
a user interface to portray at least a keyword of each of the most popular search queries across the world in a single three-dimensional graphical visual display;
wherein the user interface relates each popular query to a geographical location where the popular query has greatest popularity;
wherein the user interface shows a relative popularity of each popular query; and
wherein the user interface shows dynamically changing popularity of each popular query over time,
the user interface configured to show correlations between the geographical location where the popular query has greatest popularity, the relative popularity of each popular query, and the dynamically changing popularity of each popular query over time.

12. The Internet visualization system as recited in claim 11, wherein the user interface portrays the most popular search queries across the world as a 3-dimensional visual display of Internet activity; and
wherein 2-dimensional views of the top and sides of the 3-D visual display are user-selectable.

13. The Internet visualization system as recited in claim 11, wherein the user interface portrays the most popular search queries across the world as a 3-dimensional visual display that has a water, ocean, seascape, or aquarium visual theme.

14. The Internet visualization system as recited in claim 13, wherein the user interface portrays the most popular search queries across the world as a 3-dimensional visual display that has an ocean visual theme, wherein the user interface:
displays a geographical map on an ocean floor;
displays each popular query as a variable-size bubble in ocean water;
displays a life cycle of each popular query as a movement of each respective bubble toward the surface of the ocean water; and
displays a popularity of each bubble as a dynamically changing relative size of each bubble.

15. The Internet visualization system as recited in claim 11, further comprising criteria filters included in the query analyzer to determine most popular queries according to various criteria.

16. The Internet visualization system as recited in claim 15, wherein the criteria filters include a geographical location filter and/or a demographics filter, wherein the demographics filter selects queries by gender, age, nationality, organization, interests, income, profession, hobbies, shopping habits, and/or web pages linked to.

17. The Internet visualization system as recited in claim 11, further comprising a URL manager to provide display of a list of URLs associated with each displayed popular query.

18. The Internet visualization system as recited in claim 17, wherein the user interface provides display of a web page associated with each URL and user-controls for invoking each web page and transitioning between different web pages.

* * * * *